United States Patent [19]

Chen et al.

[11] Patent Number: 5,424,388
[45] Date of Patent: Jun. 13, 1995

[54] PULTRUSION PROCESS FOR LONG FIBER-REINFORCED NYLON COMPOSITES

[75] Inventors: Jui-Hsiang Chen; Hung-Chou Kang; Chin-Jiuh Kang, all of Hsinchu; Yuan-Der Wu, San Chong City; Ru-Fong Laiw, Hsinchu, all of Taiwan, Prov. of China

[73] Assignee: Industrial Technology Research Institute, Hsinchu, Taiwan, Prov. of China

[21] Appl. No.: 56,670

[22] Filed: Jun. 24, 1993

[51] Int. Cl.$^6$ .................. B29C 67/00; C08G 69/00
[52] U.S. Cl. ...................... 528/73; 528/314; 528/323; 264/136; 264/137; 264/236; 264/257; 264/DIG. 56
[58] Field of Search ............. 528/73, 314, 323; 524/495, 496, 494; 264/136, 137, 236, 257, DIG. 56

[56] References Cited

U.S. PATENT DOCUMENTS

| | | | |
|---|---|---|---|
| 3,494,999 | 2/1970 | Heckrotte | 264/DIG. 56 |
| 3,780,157 | 12/1973 | Hechlhammer et al. | 264/DIG. 56 |
| 4,927,583 | 5/1990 | Lottiau et al. | 264/136 |
| 5,084,222 | 1/1992 | Glemet et al. | 264/257 |

FOREIGN PATENT DOCUMENTS

| | | | |
|---|---|---|---|
| 0980402 | 1/1965 | United Kingdom | 264/DIG. 56 |
| 1165251 | 9/1969 | United Kingdom | 264/DIG. 56 |

Primary Examiner—Peter A. Szekely
Attorney, Agent, or Firm—W. Wayne Liauh

[57] ABSTRACT

A pultrusion processing method for long fiber-reinforced nylon which combines the nylon anionic ring-opening polymerization technology and the pultrusion processing method to manufacture long fiber-reinforced thermoplastic nylon composites. The method comprises the steps of forming an active caprolactam sodium salt catalyst composition by reacting melt nylon 6 monomer raw material, i.e., caprolactum, with sodium hydride, forming co-catalyst composition by melting caprolactam and a polymeric co-catalyst, then mixing the active caprolactum sodium salt catalyst composition and the co-catalyst composition in a continuous mixing device to obtain a reaction mixture with low viscosity. The mixture is then charged into a closed impregnating tank to impregnate preheated and dried reinforced fiber, which is immediately pulled into a hot mold for composite molding processing to form a finished product of long fiber-reinforced nylon composites.

7 Claims, 5 Drawing Sheets

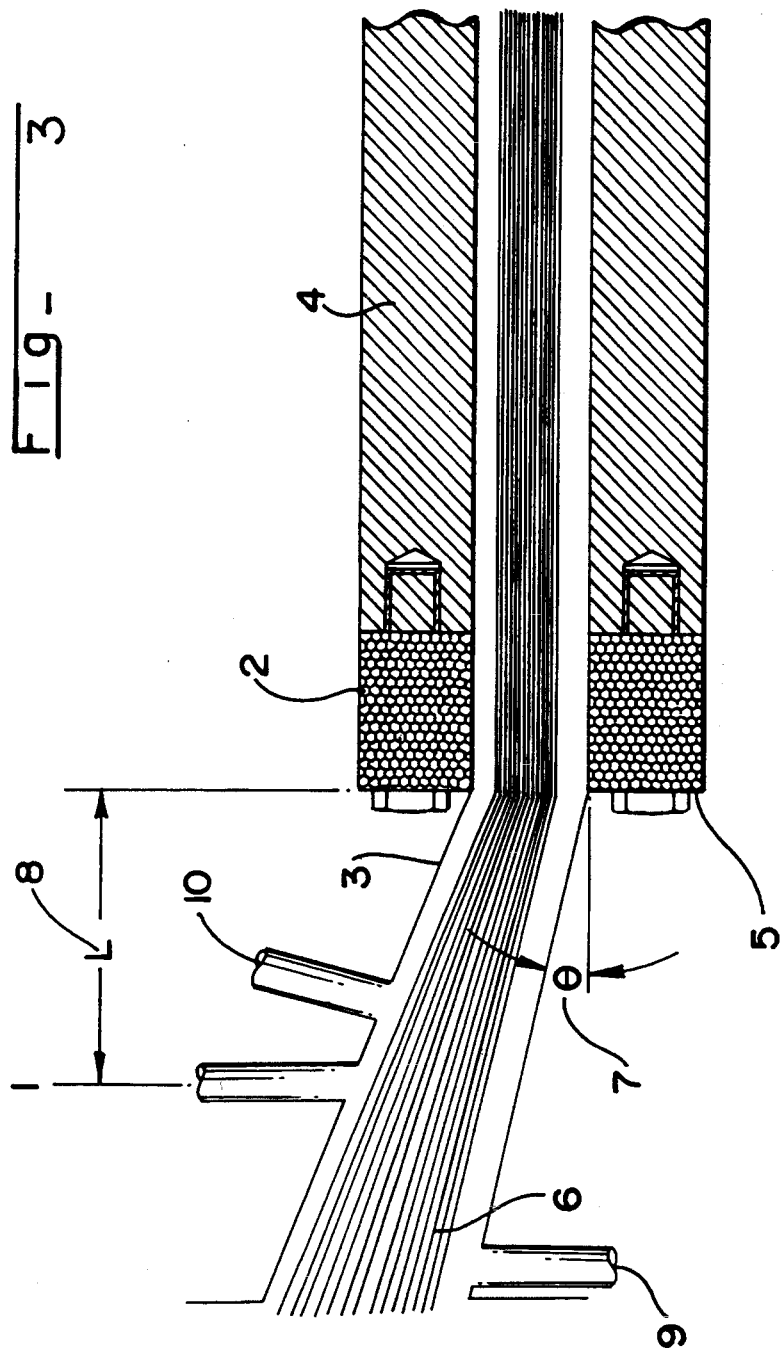

PULTRUSION PROCESS FOR LONG FIBER-REINFORCED NYLON COMPOSITES

BACKGROUND OF THE INVENTION

The invention relates to a pultrusion processing method of nylon composites which uses the technology of long fiber-reinforced nylon anionic polymerization to produce nylon composite materials. The conventional pultrusion processing method basically employs thermosetting resins with low viscosity, such as unsaturated polyester, phenolic resins, epoxy resins and the like. For these thermosetting resin systems, many commercialized pultrusion machines and processes were developed to carry out commercialized production and to manufacture various finished products of thermoset plastic composites having structural strength.

Compared to short fiber-reinforced composites, thermoplastic composites are easy to store, with a long shelf life, the ability to be second molded and possessing mechanical strength. Therefore nations with advanced industrial technology are eager to research and develop the market for long fiber-reinforced thermoplastic composites. Traditionally, due to its excellent performance, short fiber-reinforced nylon composites have been broadly used. Similarly in various types of long fiber-reinforced thermoplastic composites, nylon composites whose development and product application research are also considered important are substantially potential generation of fiber-reinforced thermoplastic composites. In the preparation method for long fiber-reinforced thermoplastic composites, commercialized preparation methods are multi-step indirect methods. Wherein after polymerized thermo plastics are melted or dissolved, the final semi-finished products of thermoplastic composite materials are molded by means of autoclaving or impregnating reinforced fiber in second molding. For the autoclaved thermoplastic composites, because of the high viscosity of melt polymers, reinforced fiber cannot be wetted well enough. This lowers the bonding strength of interfaces between resin matrix and reinforced fiber which therefore dramatically reduces the composites mechanical strength and performance. The impregnation method of dissolved polymer solution which is necessary to dry away the solvent in impregnated composites is complex, wastes power and easily results in environment pollution. Therefore the preparation method for fiber-reinforced thermoplastic composites by impregnation in a polymer solution is not ideal.

See "*RIM-Pultrusion of Thermoplastic Matrix Composites*" by H. Ishida and G. Rotter in 43rd Annual Conference, Composite Institute, The Society of the Plastic Industry, 1988. Ishida et al. used caprolactam as reactant monomer, sodium hydride as a catalyst for anionic polymerization and phenyl isocyanate as initiator. After sodium hydride and phenyl isocyanate were reacted with a caprolactam catalyst composition and an initiator composition they were formed respectively and then individually added into the resin tanks of the high temperature reaction injection molding machine. After the catalyst composition was mixed with the initiator composition at high pressure, the mixture was injected into a resin impregnating tank to impregnate the glass fiber roving. Thereafter the fiber impregnated with nylon 6 reactant was drawn into a hot mold to polymerize nylon matrix and glass fiber-reinforced nylon 6 composites were obtained. However, the data of any mechanical strength of nylon 6 composites are not disclosed in this literature, therefore it is not understood whether the processing method described by Ishida et al. is possible in practice.

A method using in-situ pultrusion processing to produce fiber-reinforced thermoplastic composites is disclosed by J. S. HWANG and S. N. TONG et al. in 44th Annu. Conf. RP/C, SPI, 8-C(1988), wherein the main objective is to develop a new thermoplastic system and novel in-situ pultrusion processing equipment. In this paper, ABS resin is obtained by reacting liquid acrylonitrile-butadiene copolymer with styrene monomer, then this resin is injected into a heating mold to prepreg the reinforced fiber and cure it. During researching, it is found that the low viscosity of resins can make the fiber well prepreged, and it is important that the final product be remolded by heating. This method provides the resins which are both safe and convenient for treatment.

A pultrusion method to produce heat resistant carbon fiber-reinforced polyether imide composites having high performance is disclosed by Maywood L. Wilson and John D. Buckley et al. in 44th Annu. Conf. RP/C, SPI, 8-C(1988). The difference between this pultrusion processing and conventional pultrusion processing of thermoset resins is that monomer reactant and solvent are not produced during the polymerization in the pultrusion mold. Besides, in order to wet and cure reinforced fiber, the viscosity of conventional thermoset resins is in the range of about 500–1,000 cps and the temperature of the pultrusion mold is about in 300°–400° F. However, in the thermoplastic pultrusion processing method, the viscosity may be up to 1,000,000 cps or more and the temperature may be 800° F.

The same RIM-Pultrusion molding method described above is continuously used to produce nylon composites by Xin Xing and Hatsuo Ishida in 1990 Annu. Conf., Composite Institute, The Society of the Plastic Industry, wherein nylon initiator in reactants of polymerization is changed with the pre-polymer obtainable by reacting polypropylene-oxide having the molecular weight of 4000 with hexamethylene diisocyanate. However, it doesn't show any data about common mechanical properties of finished products made of nylon composites. So the processing workability and the practical possibility of nylon composites can't be confirmed.

"*A Study on the Properties of Continuous Fiber-Reinforced Nylon 6 Resin Composite Materials*" is published by Chen-chi Ma and Meng-sung Yin in ROC Polymer Seminar Meeting 1988, wherein the polymerization of nylon 6 is conducted by the method of hydrolytic polymerization.

SUMMARY OF THE INVENTION

The invention relates to a novel method for manufacturing long fiber-reinforced thermoplastic nylon composites. The method is best characterized by saying that after being melted, dehydrated and purified, caprolactam (i.e. the raw material of nylon monomer) is reacted with strong alkali sodium hydride catalyst to form an active catalyst composition, And a co-catalyst composition is formed by melting caprolactum and a prepolymer co-catalyst with NCO end group. Then the active catalyst composition is mixed with a prepolymer co-catalyst in a continuous mixing device with dry nitrogen gas blanketed at a temperature of 80°–110° C. The reaction mixture with low viscosity between 10 and 1500 cps is injected to a closed reinforced fiber impregnating tank, and after impregnating preheated and dried reinforced fiber, impregnated nylon reaction mixture is drawn into a hot mold by using the pultrusion machine. At the same time, nylon anionic ring-opened polymerization and molding processing are carried out simultaneously and the long fiber-reinforced thermoplastic nylon composites are obtained. The resulting long fiber-reinforced nylon composites, obtained through the monomer with low viscosity as resin matrix, may achieve a thorough wetting effect of fibers so as to reduce the void defects at the interfaces between nylon matrix and reinforced fiber in composites. Therefore the nylon composites produced by this pultrusion processing method of long fiber-reinforced anionic polymeric nylon composites of the invention exhibit the most excellent mechanical strength and performance.

In the pultrusion process of the long fiber-reinforced anionic polymerization nylon composites of the invention, the polymerization of nylon matrix uses the anionic ring-opening fast polymerization technique. Therefore the moisture content of the nylon monomer shall be controlled in a state approximately free of water. Before being impregnated with the caprolactam monomer, the reinforced long fiber must be preheated thoroughly to remove moisture, so that nylon anionic polymerization is conducted without problems to obtain well polymerized products of nylon composite materials.

In this invention, the moisture content of caprolactam monomer raw materials, according to what the inventors understand, is required to be controlled to less than 500 ppm so as to conduct nylon anionic polymerization without problems. Because the moisture content of caprolactam monomer raw material used in industry is usually above 900–1,000 ppm, it isn't suitable for a nylon anionic ring-opening polymerization system. In the nylon pultrusion processing procedure of the invention, the moisture content of caprolactam monomer is reduced to be less than 500 ppm, by the technology of reduced pressure distillation, to correspond with the especial requirement of nylon anionic polymerization.

Basically, alkali catalysts suitable for nylon anionic ring-opening polymerization system are categorized into three types; the first one is alkali metal elements such as lithium, potassium and sodium etc. or related hydride compounds thereof, the second one is organic metallic derivatives of the first type of catalyst such as butyl lithium, ethyl potassium and propyl sodium, and the third one is a salt formed with Grignard reagent and caprolactam monomer such as bromomagnesium caprolactam salt. The catalysts described above may be used either alone or in a mixture thereof in order to adjust the rate of polymerization.

The co-catalysts suitable for the nylon anionic polymerization in this invention are polymeric co-catalysts having an NCO functional group at the end of molecular chain which is obtained by reacting polyglycol compound with diisocyanate compound. During the preparation of polymeric co-catalyst, the ratio of NCO group equivalent number and OH group equivalent number (NCO/OH Index) can be controlled in the range of 1.2–3.0, preferably in the range of 1.5–2.2. Polyglycol can be any polyglycol selected from the group consisting of long chain polyether, polysilicone, polyester, polycaprolactam and hydroxyl terminated polybutadiene having OH end groups or a mixture thereof. Diisocyanate used for the preparation of polymeric cocatalyst can be aliphatic or aromatic diisocyanates, wherein aliphatic diisocyanates are preferable. Aliphatic diisocyanates suitable for the invention are:

1. isophrone diisocyanate (IPDI);
2. hexamethylene diisocyanate (HDI);
3. dicyclohexylmethane diisocyanate; and,
4. cyclohexyl diisocyanate.

There are many types of fiber-reinforced materials used in commercialized products, for example inorganic glass fiber, carbon fiber and organic polyamide fiber or mixing fiber combining organic and inorganic fiber. But, according to the researching results of the inventors, it is found that inorganic glass fiber and carbon fiber are the most preferable to be used as long fiber reinforcement in the pultrusion processing method of long fiber-reinforced anionic polymerization nylon composites of the invention. The testing standards of mechanical properties of fiber-reinforced nylon composites in the invention are shown as the following:

| | |
|---|---|
| tensile strength | ISO 3268 |
| flexural strength | ASTM D790 |
| Heat distortion temperature | ASTM D648 |
| Izod impact strength | ASTM D256 |

BRIEF DESCRIPTION OF THE DRAWINGS

FIG. 2.2 is a detailed schematic drawing of a pultrusion processing device design of anionic polymerization nylon of the invention.

FIG. 2.3 is a design drawing of the combination of a reinforced fiber impregnation tank and a hot mold in nylon pultrusion processing device of the invention.

FIGS. 2.4A–2.4C are scanning electroic microscopic pictures of finished products from the process of the present invention.

DETAILED DESCRIPTION OF THE PREFERRED EMBODIMENT

Figure 1:
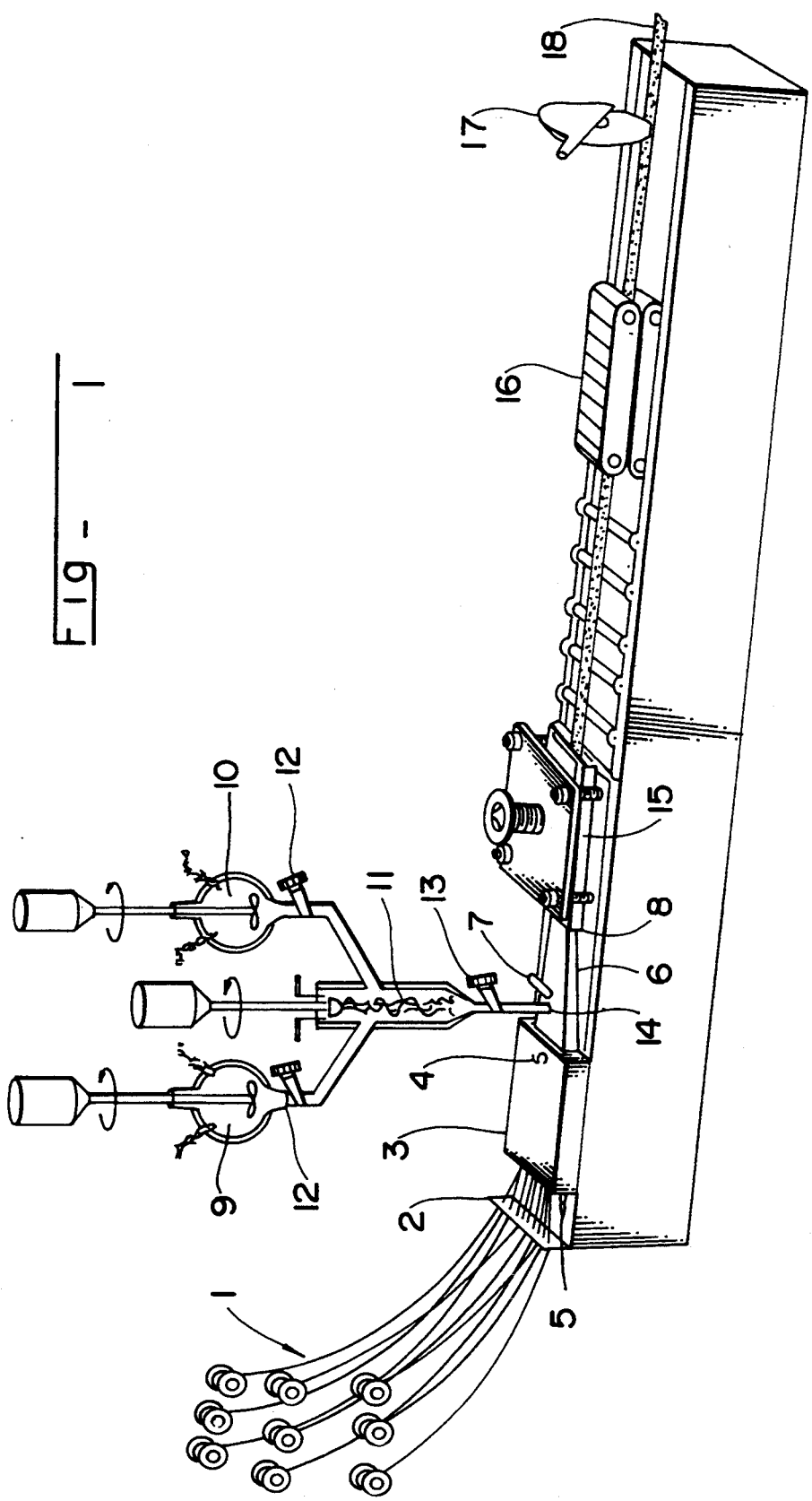

The following examples will provide detailed illustrations of the technology and objectives of the present invention, but are not intended to limit the claims of the invention.

EXAMPLE 1

Preparation of Caprolactam Monomer with Low Moisture Content

The method of purifying and dehydrating caprolactam in the invention utilizes the technology of reduced pressure and vacuum distillation. The objective of purification and dehydration is to reduce moisture content of caprolactam to below 500 ppm, so that caprolactam monomer can be suitable for use in nylon anionic polymerization. In this example, the treatment amount of purifying and dehydrating caprolactam is 30 Kg/batch. The results are shown in Table 1:

TABLE 1

Resource of caprolactam raw material: industrial solid flake caprolactam monomer available from ROC Chemistry Co.
Treatment amount of caprolactam: 30 Kg/batch
Treatment conditions of purifying and dehydrating caprolactam:

1. Temperature of caprolactam monomer in distillation tank: 145° C.
2. Reflux time of distillation: reflux 2 hours
3. Degree of vacuum in distillation tank: 750 mmHg
Moisture content of caprolactam before treatment: 1,000 ppm

TABLE 1-continued

Moisture content of caprolactam after treatment: 280 ppm

In this example, moisture content of caprolactam may be reduced from 1,000 ppm to 280 ppm in 2 hours by purification under the conditions of reduced pressure and vacuum distillation above, which is suitable to be used in the pultrusion processing of long fiber-reinforced anionic polymerization nylon composites of the invention to satisfy the demand for caprolactam with low moisture content, less than 500 ppm.

EXAMPLE 2

The pultrusion processing of Long Fiber-Reinforced Anionic Polymerization Nylon Composites After 1000 g (1 mole) of poly-propylene oxide long chain polyether polyglycol having two OH end groups and the molecular weight of 1000 g/mole and 444 g (2 mole) of isophorone diisocyanate (IPDI) are added into reaction tank, mixed well and then is added with 0.06 g of dibutyltin dilaurate to be mixed uniformly, the mixture is heated to 50° C., reacted with stirring for 4 hours at 50° C., and transparent polymeric co-catalyst No. IPPG1000-2 having NCO end groups is obtained.

Preparation of Active Caprolactam Sodium Salt Catalyst Composition

After caprolactam monomer with low moisture content purified in the same manner as example 1 is heated to 90° C., proper amount (as shown in Table 2.1) of sodium hydride is added and stirred for 20 minutes to form active caprolactam sodium salt catalyst side. Thereafter, the catalyst composition is placed in an active caprolactam sodium salt catalyst composition tank with nitrogen gas blanketing and held at a temperature of 90°-110° C.

Preparation of Polymeric Co-Catalyst

Caprolactam monomer with low moisture content purified in the same manner as example 1 together with No. IPPG 1000-2 polymeric co-catalyst (the respective amounts as shown in Table 2.1) are added in the polymeric co-catalyst composition tank and heated to a temperature of 90°-110° C.

Figure 2:
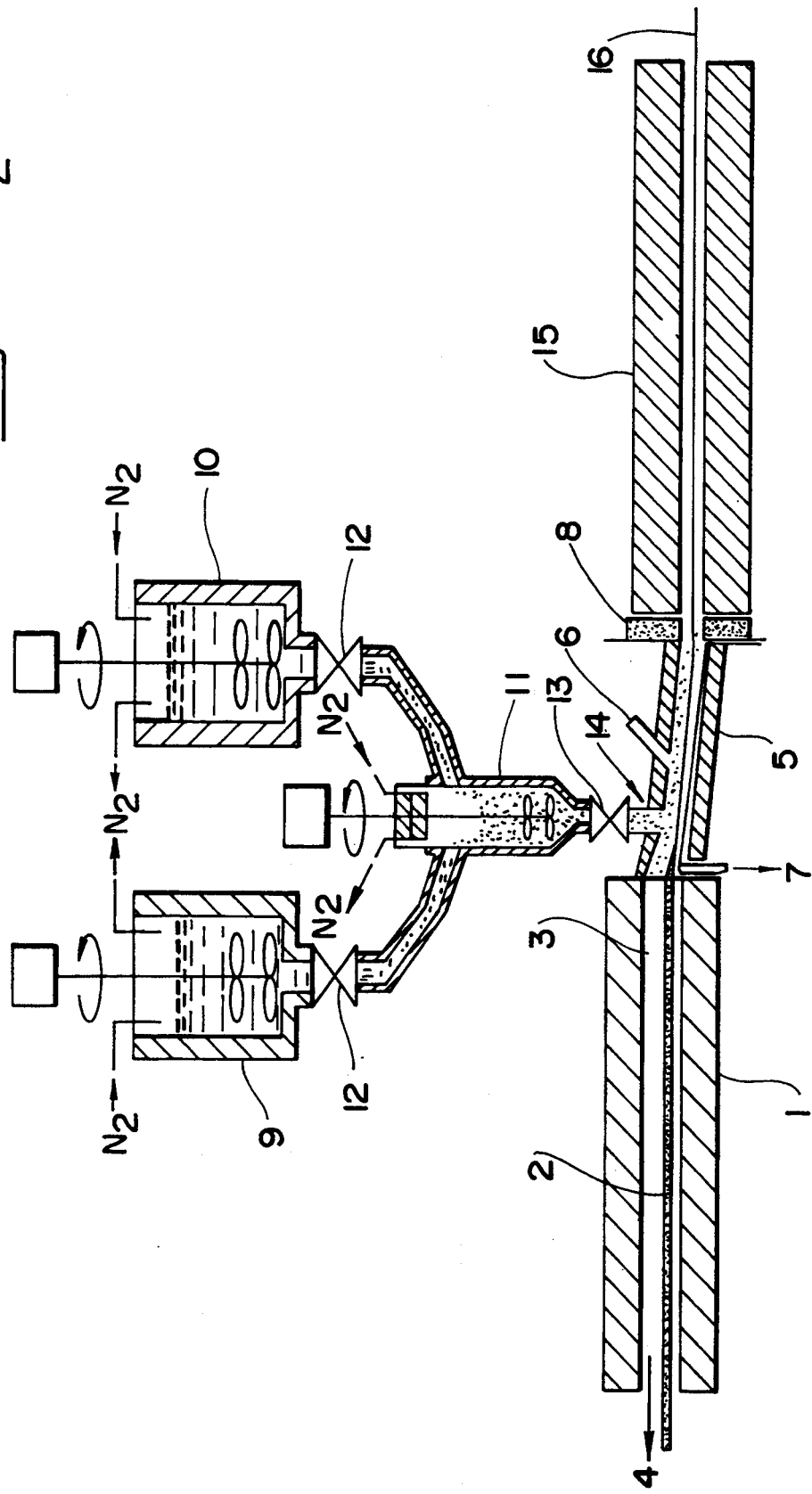
FIG. 2.1 is a schematic drawing of a pultrusion processing method of long fiber-reinforced anionic polymerization nylon composites of the invention.
Figure 4A:
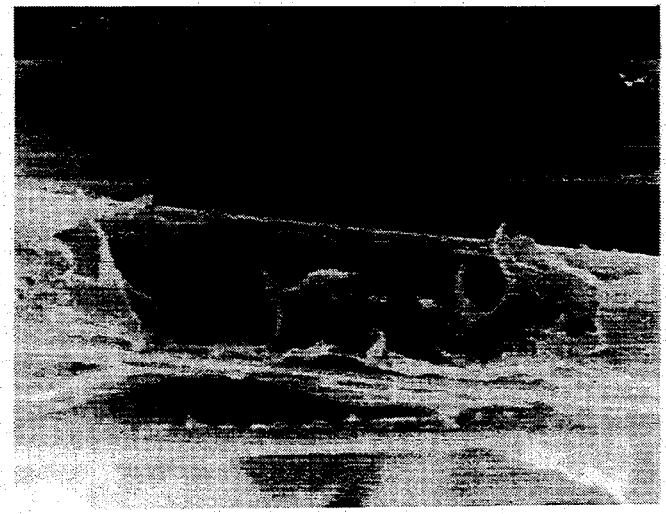
Figure 4B:
Figure 4C:
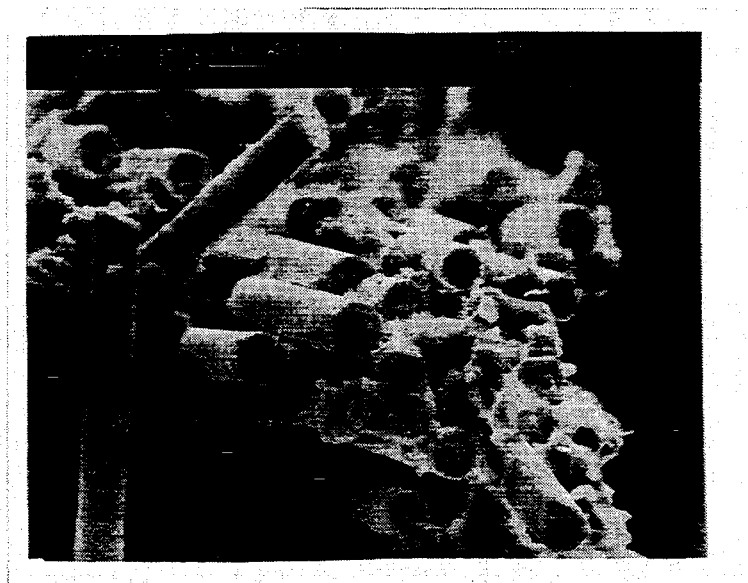

The Pultrusion Processing of Long Fiber-Reinforced Anionic Polymerization Nylon Composites FIG. 2.1 is a schematic drawing of a pultrusion processing method of long fiber-reinforced anionic polymerization nylon composites of the invention. FIG. 2.2 is a detailed schematic drawing of a pultrusion processing device design of anionic polymerization nylon of the invention. FIG. 2.3 is a design drawing of the combination of a reinforced fiber impregnation tank and a hot mold in a nylon pultrusion processing device of the invention. In the pultrusion processing method of long fiber-reinforced anionic polymerization nylon composites of this invention, because the polymerization method of nylon matrix employs anionic fast polymerization method, the polymerization rate of nylon matrix depends on the temperature, concentrations of the catalyst and polymeric co-catalyst in the resin formulation. Besides, the presence of inner and outer moisture of the anionic polymerization system also affects nylon matrix reactivity. Therefore, in the pultrusion method of long fiber-reinforced anionic polymeric nylon composites, reinforced long fiber must be thoroughly preheated and dehydrated to prevent minor moisture adsorbed on the fiber surfaces from being brought into the reaction system. Additionally, during processing, since at high temperatures the mold easily transfers heat energy into the impregnating tank, the resin reactivity may be increased to result in an increase in the viscosity of resin. The gel will be formed at the end of the impregnating tank so as to reduce the impregnating effect into fiber and even clog the mold to break the process. In this invention, one heat-insulating apparatus is inserted between the impregnating tank and the mold, so the junction of the end of the impregnating tank and the mold is held at a temperature below 115° C. and the processing is continuously operated for over 8 hours without problems. In FIG. 2.1, reinforced fibers are preheated in 3 m-long fiber preheating device, preferably at a temperature between 150° C. to 250° C. Active caprolactam sodium salt catalyst composition and co-catalyst composition are mixed in a continuous tubular mixing device with nitrogen gas blanketing at a temperature of 90°-110° C., and the mixing ratio of active caprolactam sodium salt catalyst composition and co-catalyst composition is controlled in 1:0.9-1.1. Thereafter, the reaction mixture with low viscosity is fed into a closed stainless steel reinforced fiber impregnating tank with nitrogen gas blanketing at a temperature of 90°-110±5° C. After reinforced glass long fiber (glass roving available from PPG Co. #247) is impregnated with reaction monomer mixture having low viscosity in impregnating tank and then sent into a hot mold at a temperature of 210±5° C. to conduct nylon anionic polymerization, the polymerized molding material is drawn to become glass long fiber-reinforced nylon composites. The process can be continuously operated for 8 hours under the process conditions as shown in this example, and the pulling rate is about 35 to 40 cm/min (mold length: 1 m).

The mechanical properties of the products of glass long fiber-reinforced nylon composites are tested and listed as shown in Table 2.1. In FIG. 2.4, the impregnation and combination of nylon matrix and glass long fiber-reinforced materials in finished products are observed by scanning with an electron microscope which uses No. IPPG 1000-2-10-G75 in Table 2.1 as a sample of glass long fiber-reinforced nylon composite finished product. From FIG. 2.4, the resulting nylon composites manufactured by the pultrusion process of long fiber-reinforced nylon designed by this invention are sure to have the thorough wetting effect of nylon matrix to reinforced glass long fiber. At the same time there is an excellent combined effect at the interfaces between nylon matrix and reinforced glass long fiber.

TABLE 2.1

| Print product number | IPPG1000 -2-10-G79 | IPPG1000 -2-10-G75 | IPPG1000 -2-10-G77 | IPPG1000 -2-10-G75 | IPPG1000 -2-6-G73 | IPPG1000 -2-6-G64 | IPPG1000 -2-3-G74 |
|---|---|---|---|---|---|---|---|
| Polymeric co-catalyst number | IPPG1000-2 | IPPG1000-2 | IPPG1000-2 | IPPG1000-2 | IPPG1000-2 | IPPG1000-2 | IPPG1000-2 |
| NaH amount (g/1 Kg reaction mixture) | 0.13 | 0.13 | 0.15 | 0.15 | 0.2 | 0.2 | 0.3 |
| Temperature of reaction | 110 | 110 | 105 | 105 | 100 | 100 | 90 |

TABLE 2.1-continued

| Print product number | IPPG1000-2-10-G79 | IPPG1000-2-10-G75 | IPPG1000-2-10-G77 | IPPG1000-2-10-G75 | IPPG1000-2-6-G73 | IPPG1000-2-6-G64 | IPPG1000-2-3-G74 |
|---|---|---|---|---|---|---|---|
| mixture (°C.) | | | | | | | |
| Viscosity of reaction mixture (cps) | 150 | 100 | 40 | 40 | 30 | 15 | 14 |
| Weight fraction of polymeric co-catalyst in the nylon matrix (%) | 30 | 20 | 10 | 10 | 6 | 6 | 3 |
| Mechanical Properties: | | | | | | | |
| Type of reinforced long fiber | Glass fiber | Glass fiber | Glass fiber | Glass fiber | Glass fiber | Glass fiber | Glass fiber |
| Content of fiber (weight %) | 79.2 | 77.1 | 75.5 | 73.5 | 72.9 | 69.1 | 74.5 |
| Tensile modulus (MPa) | 47880 | 46000 | 44198 | 42322 | 43214 | 41050 | 44310 |
| Tensile strength (MPa) | 1305 | 1185 | 1053 | 950 | 1001 | 805 | 1115 |
| Flexural modulus (MPa) | 42150 | 41700 | 40041 | 37800 | 37618 | 32908 | 40800 |
| Flexural strength (MPa) | 518 | 504 | 495 | 457 | 490 | 445 | 501 |
| Notch Izod impact strength (Ft. lb/inch) | 57.1 | 55.0 | 53.3 | 50.0 | 52.1 | 48 | 52.8 |
| Heat distortion temperature (°C., 264 psi) | 197 | 199 | 200 | 200 | 202 | 201 | 202 |

FIG. 2.1 The schematic drawing of a pultrusion processing method of long fiber-reinforced anionic polymerization nylon composites.

The description of each designated mark is:
1. Fiber roving
2. Fiber guide
3. Fiber preheating and drying device (3 m in length, inner temperature: 150°–250° C.)
4. Dry hot air inlet (temperature of hot air: 150°–250° C.)
5. Dry hot air outlet
6. Closed stainless steel fiber impregnating tank (with dry nitrogen gas blanketing the temperature of the tank body: controlled in 90°–110° C.)
7. Dry nitrogen gas inlet
8. Heat-insulating liner (3 mm–10 mm in thickness)
9. Active caprolactam sodium salt catalyst composition tank
10. Polymeric co-catalyst composition tank
11. Continuous mixing device with dry nitrogen gas blanketing
12. Stoichiometric controlling valve
13. Feed controlling valve
14. Holding feed tube (temperature: controlled in
15. Heating mold (mold temperature: 170°–210±5° C.)
16. Tractor
17. Cutter
18. Finished product FIG. 2.2 The detailed schematic drawing of a pultrusion device design of long fiber-reinforced anionic polymeric nylon.

The description of each designated mark is:
1. Fiber preheating and drying apparatus (3 m in length, temperature: held in 150°–250° C. by an electric heater)
2. Reinforced fiber
3. Dry hot air inlet (temperature of hot air: 150°–250° C.)
4. Dry hot air outlet
5. Closed stainless steel fiber impregnating tank (with dry nitrogen gas blanketing, the temperature of tank body: controlled in 90°–110° C. by an electric heater)
6. Dry nitrogen gas inlet
7. Overflow hole
8. Heat-insulating liner (3 mm–10 mm in thickness)
9. Active caprolactam sodium salt catalyst side tank (with dry nitrogen gas blanketing, the temperature of tank body: controlled in 90°–110° C. by silicone oil heating system)
10. Polymeric co-catalyst side tank (with dry nitrogen gas, the temperature of the tank body: controlled in 90°–110° C. by silicone oil heating system)
11. Continuous mixing device with dry nitrogen gas blanketing
12. Stoichiometric controlling valve
13. Reaction mixture feed controlling valve
14. Holding feed tube
15. Hot mold
16. Finished product of nylon composite FIG. 2.3 The design drawing of the combination of a reinforced fiber impregnating tank and a hot mold.

The description of each designated mark is:
1. Reaction mixture inlet
2. Heat-insulating liner (3 mm–10 mm in thickness, the temperature of the end of fiber impregnating tank in position 5 of FIG. 2.3: held below 115° C.)
3. Closed stainless steel fiber impregnating tank (the temperature of tank body: controlled in 90°–110° C.)
4. Upper and lower hot molds by an electric heater
5. Orifice gates at the end of fiber impregnating tank
6. Reinforced long fiber
7. $5° < \text{\textcircled{H}} < 25°$
8. $8 \text{ cm} < L < 20 \text{ cm}$

EXAMPLE 3

The Preparation of Polymeric Co-Catalyst

After 1 mole of poly-propylene oxide long chain polyether polyglycol having two OH end groups and the molecular weight of 400, 2,000 and 4,000 (g/mole) together with 2 mole of isophorone diisocyanate are added into the reaction tank to be thoroughly mixed with stirring, then 0.06 g of dibutyltin dilaurate is added and mixed uniformly, the mixture is heated to 50° C., stirred at 50° C. for 4 hours and polymeric co-catalysts Nos. IPPG400-2, IPPG2000-2 and IPPG4000-2 are obtained respectively.

The Preparation of Active Caprolactam Sodium Salt Catalyst Composition

After dehydrated and purified caprolactam monomer with low moisture content, less than 500 ppm, is heated to 90° C., proper amount (as shown in Table 3.1) of sodium hydride is added and stirred to form an active caprolactam sodium salt catalyst composition. Thereafter, the catalyst composition is placed in active caprolactam sodium salt catalyst composition tank with nitrogen gas and held at a temperature of 90°–110° C.

The Preparation of Polymer Co-Catalyst Composition

Dehydrated and purified caprolactam monomer with low moisture content, less than 500 ppm, together with polymeric co-catalyst (the types and amounts as shown in Table 3.1) are added, placed into polymeric co-catalyst composition tank with nitrogen gas and heated to a temperature of 90°–110° C.

The Pultrusion Processing of Long Fiber-Reinforced Anionic Polymerization Nylon Composites The glass long fiber-reinforced nylon composites with the pulling rate of 34 to 38 cm/min (mold length: 1 m, mold temperature: 200°±5° C.) are obtained by means of the same pultrusion processing method of nylon composites as shown in FIG. 2.1 using reinforced glass long fiber of glass roving available from PPG Co. #247 and the formulation of nylon matrix as shown in Table 3.1 under the reaction conditions in Table 3.1. In this example, the mechanical properties of the products of glass long fiber-reinforced nylon composites manufactured by pultrusion processing are tested and listed as shown in Table 3.1.

The Preparation of Polymeric Co-Catalyst Composition

Dehydrated and purified caprolactam monomer with low moisture content, less than 500 ppm, of purified and dehydrated caprolactam monomer together with polymeric co-catalyst (the types and amounts as shown in Table 4.1) are added, placed into polymeric co-catalyst side tank with nitrogen gas and heated to a temperature of 90°–110° C.

The Pultrusion Processing of Long Fiber-Reinforced Anionic Polymerization Composites The carbon fiber-reinforced nylon composites with the pulling rate of 35 to 40 cm/min (mold length: 1 m, mold temperature: 210±5° C.) are obtained by means of the same pultrusion processing method of nylon composites as shown in FIG. 2.1 using Besfight HTA reinforced carbon fiber available from Toho Rayon Co. (Filament count=12,000, Yield=800 Tex) and the formulation of nylon matrix as shown in Table 4.1 under the reaction conditions in Table 4.1. In this example, the

TABLE 3.1

| Finished product number | IPPG400-2 -30-G74 | TPPG400-2 -10-G75 | IPPG2000-2 -10-G76 | IPPG4000-2 -10-G77 |
|---|---|---|---|---|
| Polymeric co-catalyst number | IPPG400-2 | IPPG400-2 | IPPG2000-2 | IPPG4000-2 |
| NaH amount (G/1 Kg reaction mixture) | 0.15 | 0.13 | 0.2 | 0.3 |
| Temperature of reaction mixture (°C.) | 90 | 105 | 100 | 100 |
| Temperature of reaction mixture (cps) | 1100 | 250 | 100 | 220 |
| Weight fraction of polymeric co-catalyst in the nylon matrix (%) | 30 | 10 | 10 | 10 |
| Mechanical properties | | | | |
| Type of reinforced long fiber | Glass fiber | Glass fiber | Glass fiber | Glass fiber |
| Content of fiber (weight %) | 73.5 | 74.6 | 76.1 | 76.8 |
| Tensile modulus (MPa) | — | 44500 | 44850 | — |
| Tensile strength (MPa) | — | 1069 | 1180 | — |
| Flexural modulus (MPa) | — | 39800 | — | — |
| Flexural strength (MPa) | — | 488 | — | — |
| Notch izod impact strength (Ft. lb/inch) | 54.2 | 51.0 | 56.1 | 55.8 |
| Heat distortion temperature (°C., 264 psi) | 194 | 197 | 202 | 204 |

EXAMPLE 4

The Preparation of Polymeric Co-Catalyst

After 1 mole of polytetramethylene glycol (PTNG) long chain polyether polyglycol having two OH end groups and the molecular weight of 1,000 and 2,000 (g/mole) together with 2 moles of isophorone diisocyanate are added into the reaction tank to be thoroughly stirred, then supplemented with 0.03 g of dibutyltin dilaurate and mixed uniformly. The mixture is heated to 50° C., reacted with stirring at 50° C. for 4 hours and polymeric co-catalyst Nos. IPTG1000-2 and IPTG2000-2 are obtained respectively.

The Preparation of Active Caprolactam Sodium Salt Catalyst Composition

After dehydrated and purified caprolactam monomer with low moisture content, less than 500 ppm, is heated to 90° C., proper amount (as shown in Table 4.1) of sodium hydride is added and stirred to form active caprolactam sodium salt catalyst composition. Thereafter, the catalyst composition is placed in active caprolactam sodium salt catalyst composition tank with nitrogen gas and held at a temperature of 90°–110° C.

mechanical properties of the products of carbon long fiber-reinforced nylon composites manufactured by pultrusion processing are tested and listed as shown in Table 4.1.

TABLE 4.1

| Finished product number | IPTG1000-2 -10-C75 | IPTG2000-2 -10-C76 |
|---|---|---|
| Polymeric co-catalyst number | IPTG1000-2 | IPTG2000-2 |
| NaH amount (g/1 Kg reaction mixture) | 0.2 | 0.2 |
| Temperature of reaction mixture (°C.) | 110 | 110 |
| Viscosity of reaction mixture (cps) | 55 | 65 |
| Weight fraction of polymeric co-catalyst in the nylon matrix (%) | 15 | 10 |
| Mechanical properties: | | |
| Type of reinforced long fiber | Carbon fiber | Carbon fiber |
| Content of fiber (weight %) | 75.1 | 76.2 |
| Tensile strength (MPa) | 1630 | 1785 |
| Heat distortion temperature (°C., 264 psi) | 204 | 206 |

EXAMPLE 5

The Preparation of a Polymeric Co-Catalyst

Polysilicone long chain polyglycols having two OH end groups and the molecular weights of 1000 and 3205 (g/mole) are used, and the molecular structure is represented by the following:

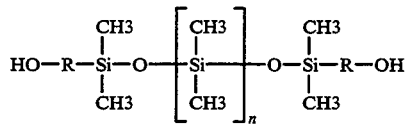

wherein R is an alkyl, aryl or arylalkyl group.

1 mole of long chain polysilicone polyglycol with the molecular weight of 1,000 and 3,205 (g/mole) together with 2 moles of isophorone diisocyanate are added into the reaction tank to be thoroughly mixed by stirring. Then 0.08 g of dibutyltin dilaurate is added and mixed uniformly. The mixture is heated to 50° C., reacted by stirring at 50° C. for 4 hours and polymeric co-catalyst Nos. IS1000-2 and IS3205-2 are obtained respectively.

0.5 mole of long chain polysilicone polyglycol with the molecular weight of 1000 is well mixed with 0.5 mole of polypropylene oxide long chain polyether polyglycol with the molecular weight of 1000. Thereafter, the mixture together with 2 moles of isophorone diisocyanate is poured into the reaction tank to be thoroughly stirred. Then 0.08 g of dibutyltin dilaurate is added and mixed uniformly. The resulting mixture is heated to 50° C. for 6 hours and polymeric co-catalyst No. IPS1000-2 is obtained.

The Preparation of Active Caprolactam Sodium Salt Catalyst Composition

After dehydrated and purified caprolactam monomer with low moisture content less than 500 ppm, is heated to 90° C., proper amount (as shown in Table 5.1) of sodium hydride is added and stirred to an form active caprolactam sodium salt catalyst composition. Thereafter, the catalyst composition is placed in the active caprolactam sodium salt catalyst composition tank with nitrogen gas and held at a temperature of 90°–110° C.

The Preparation of Polymeric Co-Catalyst Composition

Dehydrated and purified caprolactam monomer with low moisture content, less than 500 ppm, together with polymeric co-catalyst (the types and amounts as shown in Table 5.1) are added into polymeric co-catalyst composition tank with nitrogen gas and heated to a temperature of 90°–110° C.

The Pultrusion Processing of Long Fiber-Reinforced Anionic Polymerization Nylon Composites The glass long fiber-reinforced nylon composites with the pulling rate of 35 to 40 cm/min (mold length: 1 m) are obtained by means of the same pultrusion processing method of nylon composites as shown in FIG. 2.1 using PPG Co. #247 glass roving as reinforced long fiber and the formulation of nylon matrix as shown in Table 3.1 under the reaction conditions in Table 5.1. In this example, the mechanical properties of the products of glass long fiber-reinforced nylon composites manufactured by pultrusion processing are tested and listed as shown in Table 5.1.

TABLE 5.1

| Finished product number | IPS1000-2 -10-G76 | IS1000-2 -10-G75 | IS3205-2 -10-G75 |
|---|---|---|---|
| Polymeric co-catalyst number | IPS1000-2 | ISI1000-2 | IS3205-2 |
| NaH amount (g/1 Kg reaction mixture) | 02.5 | 0.25 | 0.3 |
| Temperature of reaction mixture (°C.) | 105 | 105 | 105 |
| Viscosity of reaction mixture (cps) | 55 | 35 | 45 |
| Weight fraction of polymeric co-catalyst in the nylon matrix (%) | 10 | 10 | 10 |
| Mechanical properties: | | | |
| Type of re-enforced long fiber | Glass fiber | Glass fiber | Glass fiber |
| Content of fiber (weight %) | 75.6 | 74.7 | 75.2 |
| Tensile modulus (MPa) | 44150 | 42950 | 43150 |
| Tensile strength (MPa) | 1090 | 930 | 970 |
| Heat distortion temperature (°C., 264 psi) | 200 | 198 | 200 |

What is claimed is:

1. A pultrusion processing method of long fiber-reinforced anionic polymerization nylon composites, said process comprising the steps of:
   individually transferring an active caprolactam sodium salt catalyst composition and a polymeric co-catalyst composition into a tubular mixing device with dry nitrogen gas blanketing, continuously mixing at a temperature of 80°–110° C., wherein said active caprolactam sodium salt catalyst composition is obtained by reacting melt caprolactam having low moisture content, less than 500 ppm, with sodium hydride catalyst, and said polymeric co-catalyst composition is obtained by mixing a polymeric co-catalyst having two NCO end groups with melt caprolactam having low moisture content, less than 500 ppm, to form a nylon reaction mixture;
   feeding the nylon reaction mixture having a viscosity between 10 and 1500 cps into a closed reinforced fiber impregnating tank with dry nitrogen gas blanketing, then impregnating a reinforced fiber, which has been dried and preheated with 250° C. hot air, in said nylon reaction mixture;
   immediately pulling said impregnated reinforced fiber into a hot mold whose temperature is between 165° and 215° C. while conducting nylon anionic polymerization and composites processing and forming a finished product of long fiber-reinforced nylon composites;
   further wherein said polymeric co-catalyst having NCO end groups is obtained by reacting isophorone diisocyanate with long chain glycol having two OH end groups at a mole ratio of NCO group to OH group of 1.5–2.2 to 1; and
   said long chain glycol being selected from the group consisting of polypropylene oxide long chain polyether glycol having a molecular weight of 400–4,000 (g/mole), polytetramethylene glycol (PTMG) having a molecular weight of 1,000–2,000 (g/mole), polysilicone long chain glycol having a molecular weight of 1,000–3,205 (g/mole), and a mixture of polypropylene oxide glycol and polysilicone glycol.

2. A processing method as claimed in claim 1, wherein the active caprolactam sodium salt catalyst composition and the polymeric co-catalyst composition are individually placed in separate tanks with nitrogen gas blanketing and held at a temperature of 90°–110° C. after preparing.

3. A processing method as claimed in claim 1, wherein the amounts of the sodium hydride catalyst and the polymeric co-catalyst are 0.13–0.3 wt % and 3–30 wt %, respectively, based on the total weight of the nylon reaction mixture.

4. A processing method a claimed in claim 1, wherein said reinforced long fiber is preheated and dried in a fiber preheating and drying device by hot air at 150°–250° C. and the reinforced fiber impregnating tank is combined with the mold after a ceramic or polymer heat-insulating liner, which can sustain high temperature operation condition of at least 220° C., is inserted between the end of said impregnating tank and said hot mold, wherein said heat-insulating liner having a thickness of 3 m–10 mm and said liner has the effect that makes the temperature at the junction of the end of said impregnating tank and said liner less than 115° C.

5. A processing method as claimed in claim 1, wherein said reinforced long fiber is an inorganic continuous glass fiber or carbon fiber.

6. A pultrusion processing method of long fiber-reinforced anionic polymerization nylon composites, said process comprising the steps of: individually transferring an active caprolactam sodium salt catalyst composition and a polymeric co-catalyst composition into a tubular mixing device with dry nitrogen gas blanketing, continuously mixing at a temperature of 80°–110° C., wherein said active caprolactam sodium salt catalyst composition is obtained by reacting melt caprolactam having a low moisture content of less than 500 ppm, with sodium hydride catalyst, and said polymeric cocatalyst composition is obtained by mixing a polymeric co-catalyst having two NCO end groups with melt caprolactam having a low moisture content of less than 500 ppm to form a nylon reaction mixture; feeding the nylon reaction mixture having a viscosity between 10 and 1500 cps into a closed reinforced fiber impregnating tank with dry nitrogen gas blanketing, then impregnating reinforced fiber, which has been dried and preheated with 250° C. hot air, in said nylon reaction mixture; immediately pulling into a hot mold whose temperature is between 165° and 215° C. while conducting nylon anionic polymerization and composites processing and forming a finished product of long fiber-reinforced nylon composites;

wherein the polymeric co-catalyst with NCO end groups is obtained by reacting isophorone diisocyanate with long chain glycol having two OH end groups at the mole ratio of NCO group and OH group in 1.5–2.2, wherein the long chain glycol is one selected from the group consisting of polypropylene oxide long chain polyether glycol with the molecular weight of 400–4,000 (g/mole), polytetramethylene glycol (PTMG) with the molecular weight of 1,000–2,000 (g/mole), polysilicone long chain glycol with the molecular weight of 1,000–3,205 (g/mole) and the moisture of polypropylene oxide glycol and polysilicone glycol.

7. A pultrusion processing method of long fiber-reinforced anionic polymerization nylon composites, said process comprising the steps of individually transferring an active caprolactam sodium salt catalyst composition and a polymeric co-catalyst composition into a tubular mixing device with dry nitrogen gas blanketing, continuously mixing at a temperature of 80°–110° C., wherein said active caprolactam sodium salt catalyst composition is obtained by reacting melt caprolactam having a low moisture content of less than 500 ppm, with sodium hydride catalyst, and said polymeric cocatalyst composition is obtained by mixing a polymeric co-catalyst having two NCO end groups with melt caprolactam having a low moisture content of less than 500 ppm, to form a nylon reaction mixture; feeding the nylon reaction mixture having a viscosity between 10 and 1500 cps into a closed reinforced fiber impregnating tank with dry nitrogen gas blanketing, then impregnating reinforced fiber, which has been dried and preheated with 250° C. hot air, in said nylon reaction mixture; immediately pulling into a hot mold whose temperature is between 165° and 215 ° C. while conducting nylon anionic polymerization and composites processing and forming a finished product of long fiber-reinforced nylon composites;

wherein said reinforced long fiber is preheated and dried in fiber preheating and drying device by hot air at 150°–250° C. and the reinforced fiber impregnating tank is combined with the mold after ceramic or polymer heat-insulating liner, which can sustain high temperature operation condition of at least 220° C., is inserted between the end of said impregnating tank and said hot mold, wherein the proper thickness of said heat-insulating liner is 3 m–10 mm and said liner has the effect that makes the temperature at the junction of the end of said impregnating tank and said liner less than 115° C.

* * * * *